US012707223B2

(12) United States Patent
Lyons et al.

(10) Patent No.: US 12,707,223 B2
(45) Date of Patent: Aug. 11, 2026

(54) SYSTEMS AND METHODS FOR A PERSONALIZED AUDIO SYSTEM

(71) Applicant: Harman International Industries, Incorporated, Stamford, CT (US)

(72) Inventors: Joy Lyons, Lake Forest Park, WA (US); Sean Olive, Oak Park, CA (US); Christian Garcia, Winnetka, CA (US); Todd Welti, Thousand Oaks, CA (US); Alfredo Fernandez Franco, Sherman Oaks, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 195 days.

(21) Appl. No.: 18/509,173

(22) Filed: Nov. 14, 2023

(65) Prior Publication Data

US 2024/0163630 A1 May 16, 2024

Related U.S. Application Data

(60) Provisional application No. 63/383,635, filed on Nov. 14, 2022.

(51) Int. Cl.
*H04S 7/00* (2006.01)
*H04R 1/02* (2006.01)

(52) U.S. Cl.
CPC ............ *H04S 7/303* (2013.01); *H04R 1/025* (2013.01); *H04S 7/301* (2013.01);
(Continued)

(58) Field of Classification Search
None
See application file for complete search history.

(56) References Cited

U.S. PATENT DOCUMENTS

| | | | |
|---|---|---|---|
| 9,955,279 | B2 | 4/2018 | Riggs et al. |
| 10,129,681 | B2 | 11/2018 | Riggs et al. |

(Continued)

FOREIGN PATENT DOCUMENTS

| | | | | |
|---|---|---|---|---|
| WO | 2020210249 A1 | 10/2020 | | |
| WO | WO-2021138421 A1 * | 7/2021 | ............ | H04S 7/303 |

OTHER PUBLICATIONS

Richard O. Duda and William L. Martens, Range Dependence of the Response of a Spherical Head Model, 104 J. Acoust. Soc. Am. 3048 (1998) (Year: 1998).*

*Primary Examiner* — Walter F Briney, III
(74) *Attorney, Agent, or Firm* — McCoy Russell LLP

(57) ABSTRACT

Systems and methods are provided for personalized three-dimensional audio. In one embodiment, a sound calibration system comprises a headrest having a first speaker, a second speaker, and one or more sensors, the headrest configured to engage a head of a user, and a controller with computer readable instructions stored on non-transitory memory. The instructions, when executed, cause the controller to create customized spatial audio by utilizing a head-related impulse response (HRIR) that is modified based on an input audio signal, the location of the audio source and receiver, and the head position of the user. The resulting audio output is generated by applying the HRIR and interaural crosstalk cancellation filters to frequencies above a threshold frequency.

15 Claims, 11 Drawing Sheets

(52) U.S. Cl.
CPC ....... *H04R 2400/11* (2013.01); *H04S 2400/07* (2013.01); *H04S 2400/11* (2013.01); *H04S 2420/01* (2013.01)

(56) References Cited

U.S. PATENT DOCUMENTS

| | | | | |
|---|---|---|---|---|
| 10,939,225 | B2 | 3/2021 | Riggs et al. | |
| 10,993,065 | B2 | 4/2021 | Riggs et al. | |
| 2010/0246831 | A1* | 9/2010 | Mahabub | G10L 19/018 381/17 |
| 2022/0167109 | A1* | 5/2022 | Giron | H04S 7/30 |
| 2022/0169186 | A1* | 6/2022 | Laury | H04S 7/303 |
| 2022/0174446 | A1* | 6/2022 | Watanabe | H04S 7/302 |
| 2022/0295212 | A1* | 9/2022 | Vilkamo | H04S 7/302 |
| 2025/0088817 | A1* | 3/2025 | Kaihoko | H04S 7/305 |

* cited by examiner

SYSTEMS AND METHODS FOR A PERSONALIZED AUDIO SYSTEM

CROSS REFERENCE TO RELATED APPLICATIONS

The present application claims priority to U.S. Provisional Application No. 63/383,635, entitled "SYSTEMS AND METHODS FOR A PERSONALIZED AUDIO SYSTEM", and filed on Nov. 14, 2022. The entire contents of the above-listed application are hereby incorporated by reference for all purposes.

FIELD

The disclosure relates to signal processing for a personalized audio system.

BACKGROUND

Acoustical waves interact with their environment through such processes including reflection (diffusion), absorption, and diffraction. These interactions are a function of the size of the wavelength relative to the size of the interacting body and the physical properties of the body itself relative to the medium. For sound waves, defined as acoustical waves travelling through air at frequencies in the audible range of humans, the wavelengths are in between approximately 1.7 centimeters and 17 meters. The human body has anatomical features on the scale of sound causing strong interactions and characteristic changes to the sound-field as compared to a free-field condition. A listener's ears, the head, torso, and outer ear (pinna) interact with the sound, causing characteristic changes in time and frequency, called the Head Related Transfer Function (HRTF). Alternately, the sound filtering effects of the body of a listener may be referred to by a related representation, the Head Related Impulse Response, (HRIR). Variations in anatomy between humans may cause the HRTF to be different for each listener, different between each ear, and different for sound sources located at various locations in space (r, theta, phi) relative to the listener. When integrated into an audio system, HRTF/HRIR can offer a customized audio experience for individual listeners. However, implementing HRTF/HRIR in audio environments where listeners have freedom of movement poses particular challenges due to the impact of head position and body movement on the sound filtering effects. Accordingly, signal-processing strategies that integrate personalized calibrations for users in audio systems where they can freely move relative to the speakers would be advantageous.

SUMMARY

According to an aspect of the present disclosure, a sound calibration system for an audio system is provided. The sound calibration system comprises a headrest having a first speaker, a second speaker, and one or more sensors, the headrest configured to engage a head of a user, and a controller with computer readable instructions stored on non-transitory memory. When executed, the instructions cause the controller to generate personalized spatial audio using a head related impulse response (HRIR), the HRIR modified based on an input audio signal, an audio signal source location, a receiver location, and a head position of the user relative thereto. The instructions further cause the controller to produce audio output based on the HRIR and further based on interaural crosstalk cancellation filters filtering the input audio signal. The HRIR and the interaural crosstalk cancellation filters are applied to frequencies greater than a first threshold frequency.

In another aspect of the present disclosure, a method of calibrating sound for a listener is provided. The method comprises receiving an input audio signal, an audio signal source location, a receiver location, and a head position of a user. The method comprises determining an HRIR for a user based on an array of time aligned HRIR corresponding to locations around the user, the audio signal source location, the receiver location, and the head position. The method comprises dividing the input audio signal into a high frequency band and a low frequency band, applying delay and equalizing to the low frequency band, and convolving the high frequency band with the HRIR. The method comprises filtering the HRIR filtered signals with interaural crosstalk cancellation filters to produce a crosstalk filtered high frequency output. The filtered low frequency output and the crosstalk filtered high frequency output are combined and audio output is produced from the combined filtered signals.

In another aspect of the present disclosure, a system is provided. The system comprises a headrest having a left speaker and a right speaker, the headrest configured to engage a head of a user. The system comprises a sensor tracking a head position of the user, an audio signal source, an array of time aligned head related impulse responses (HRIR) corresponding to locations around the user. The system further comprises a controller in electronic communication with the sensor and the audio signal source with computer readable instructions stored on non-transitory memory. When executed, the instructions cause the controller to receive an input audio signal, an audio signal source location, a receiver location, and a head position of a user. The system determines an HRIR for a user based on an array of time aligned HRIR corresponding to locations around the user, the audio signal source location, the receiver location, and the head position. The system divides the input audio signal into a high frequency band and a low frequency band. The system applies delay and equalizing to the low frequency band and convolves the high frequency band with the HRIR. The system further filters the HRIR filtered signal with interaural crosstalk cancellation filters to produce a crosstalk filtered high frequency output. The system combines the filtered low frequency output and the crosstalk filtered high frequency output, and produces an audio output based on the combined filtered signals.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
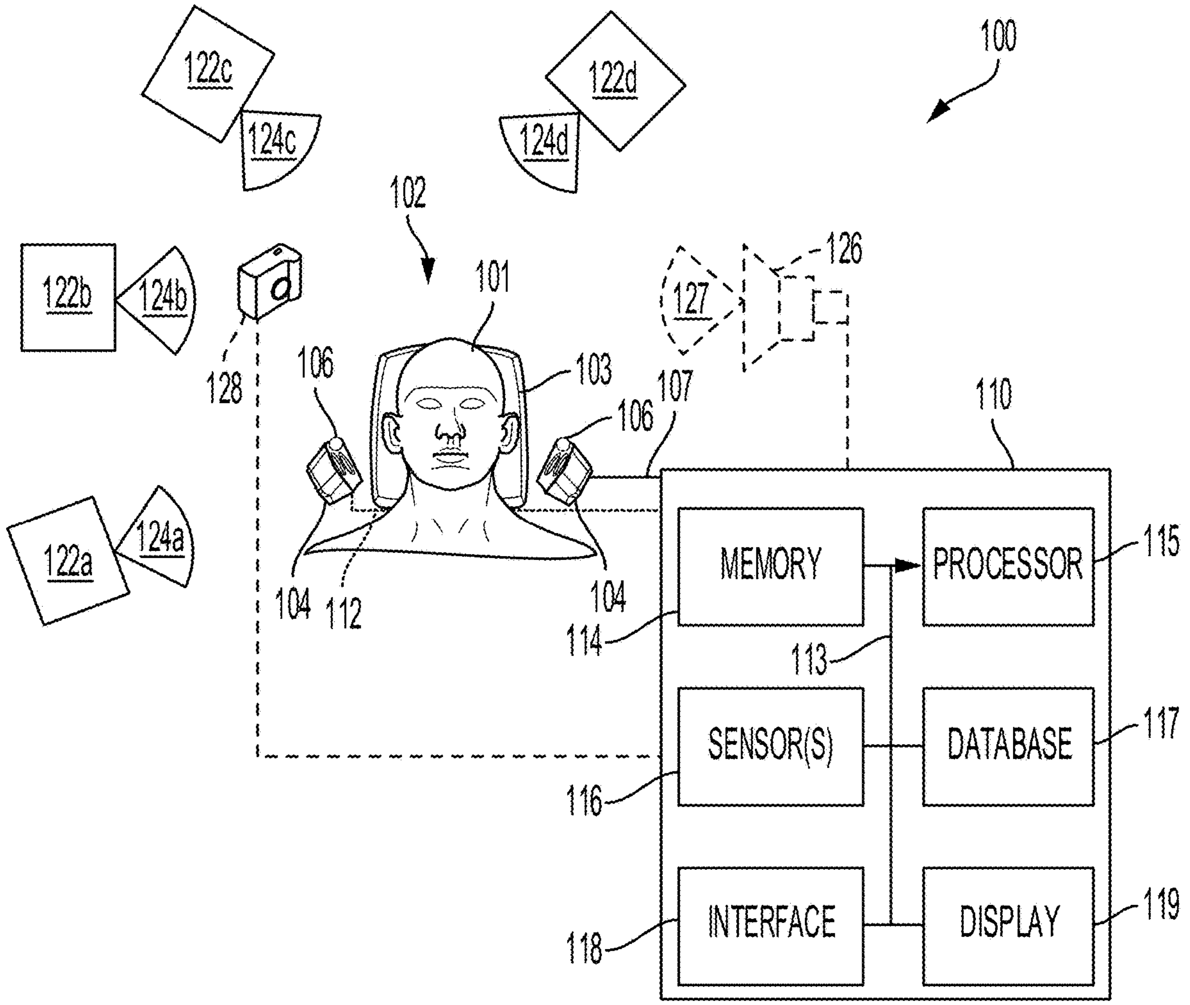
FIG. 1 shows a schematic view of an audio system in accordance with one or more embodiments of the present disclosure.

It is sometimes desirable to have sound presented to a listener such that it appears to come from a specific location in space. This effect may be achieved by the physical placement of a sound source (e.g., a loudspeaker) in the desired location. However, for simulated and virtual environments, it is inconvenient to have a large number of physical sound sources dispersed in an environment. Additionally, with multiple listeners the relative locations of the sources and listeners is distinct, causing a different experience of the sound, where one listener may be at the "sweet spot" of sound, and another may be in a less optimal listening position. There are also conditions where the sound is desired to be a personal listening experience, so as to achieve privacy and/or to not disturb others in the vicinity. In these situations, listeners may prefer sound that may be recreated either with a reduced number of sources, or through personal speakers such as headphones, in-ear speakers, and seat-back speakers. Recreating a sound field of many sources with a reduced number of sources and/or through personal speakers relies on knowledge of a listener's Head Related Transfer Function (hereinafter "HRTF") to recreate the spatial cues the listener uses to place sound in an auditory landscape.

Generally, HRTF is a frequency response function representing acoustic characteristics and filtering effects that a listener's anatomy, e.g., head, ears, torso, etc., impose on incoming sound waves as the sounds travel from a source to the eardrums of a listener. HRTF is typically characterized by its frequency response across different angles and elevations. Head Related Impulse Response (HRIR) is related to HRTF by a Fourier Transform. HRIR, is a time-domain representation of the filtering effect caused by the anatomy of the listener on an impulsive sound source. HRIR is the impulse response of the HRTF and provides information about how sound reflections and phase shifts occur over time due to the anatomy of the listener.

Disclosed herein are systems and methods for tuning immersive audio based on personalized calibrations. In particular, tuning strategies are described for audio systems including fixed speakers where the user's head is free to move. In one example, the tuning includes determining or calibrating a user's HRTF or HRIR to assist the listener in sound localization, including calibrations for environments where the speakers are not mounted to the user's head. The HRTF/HRIR is decomposed into theoretical groupings that may be addressed through various solutions, which may be used stand-alone or in combination. An HRTF and/or HRIR is decomposed into time effects, including interaural time difference (ITD), and frequency effects, which include both the interaural level difference (ILD), and spectral effects. ITD may be understood as difference in arrival time between the two ears (e.g., the sound arrived at the ear nearer to the sound source before arriving at the far ear). ILD may be understood as the difference in sound loudness between the ears, and may be associated with the relative distance between the ears and the sound source and frequency shading associated with sound diffraction around the head and torso. Spectral effects may be understood as the differences in frequency response associated with diffraction and resonances from fine-scale features such as those of the ears (pinnae). The calibration data is modified based on the input audio signal, the location of the signal, a receiver location, and real-time head tracking of the user relative thereto. An audio output is produced based on the modified HRIR and further based on filtering with interaural crosstalk cancellation, which virtually isolate each ear for a personalized spatial audio experience.

Figure 2:
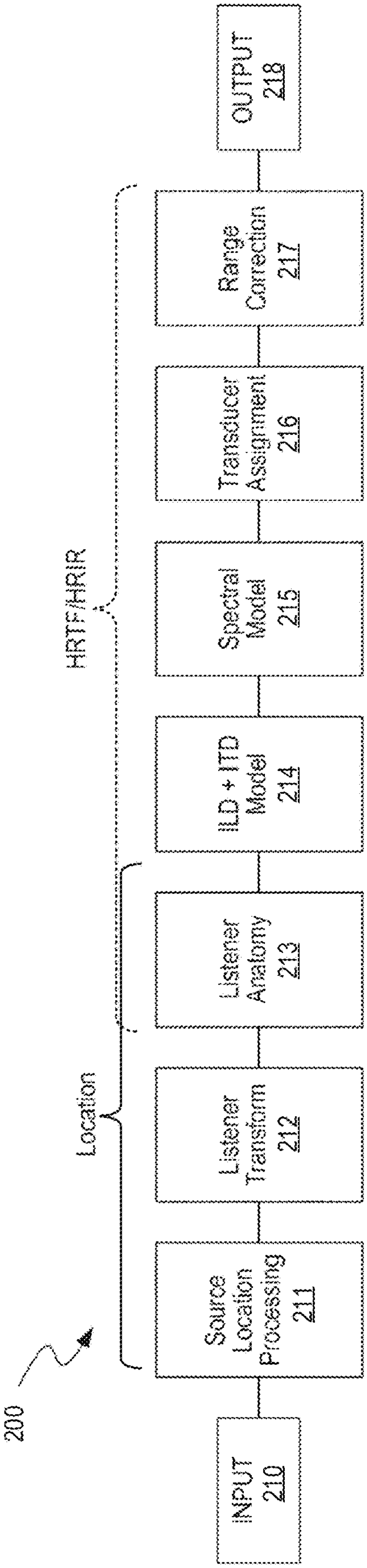
FIG. 2 shows a first flow diagram of a process of decomposing a signal in accordance with one or more embodiments of the present disclosure.
Figure 3:
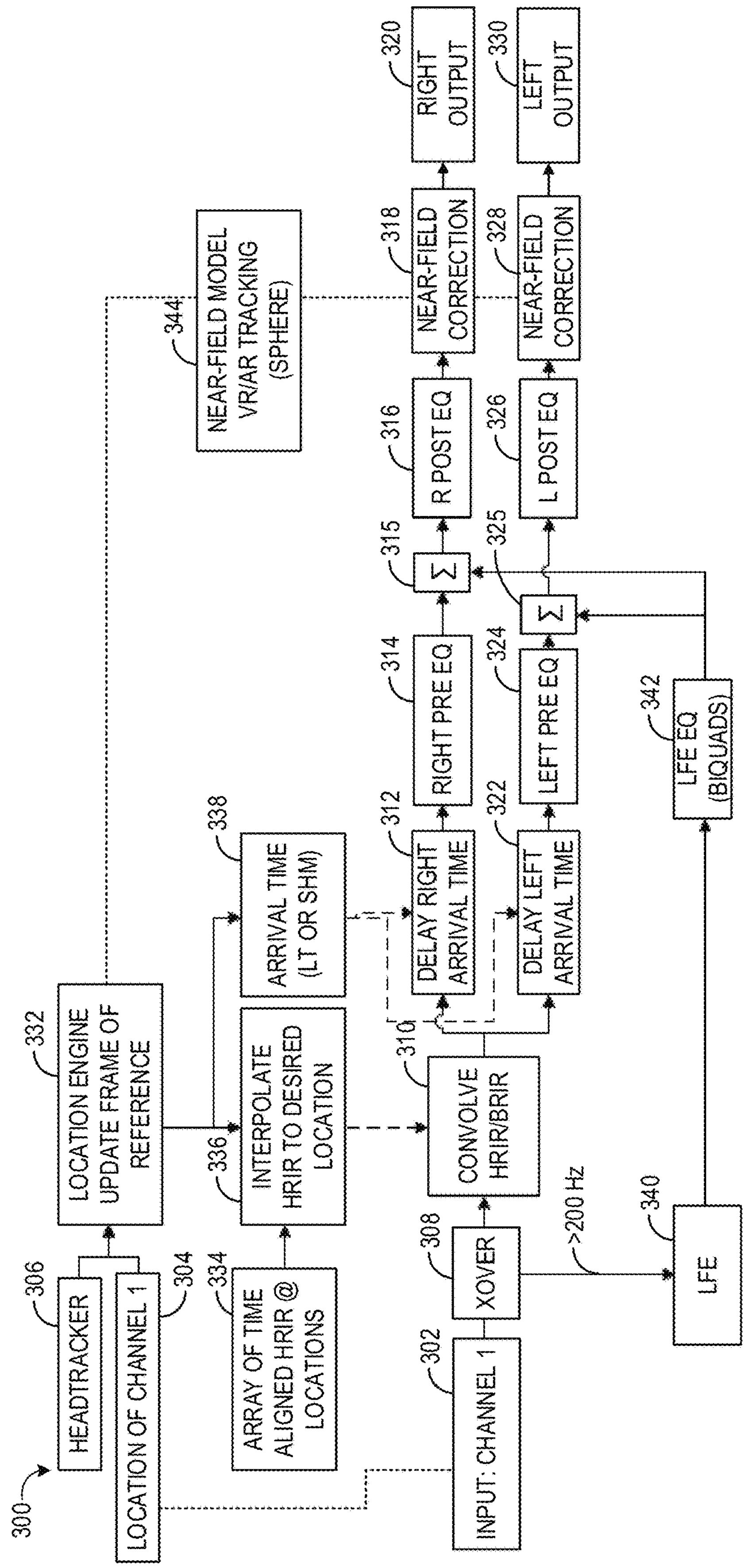
FIG. 3 shows a second flow diagram of a process of decomposing a signal in accordance with one or more embodiments of the present disclosure.
Figure 4:
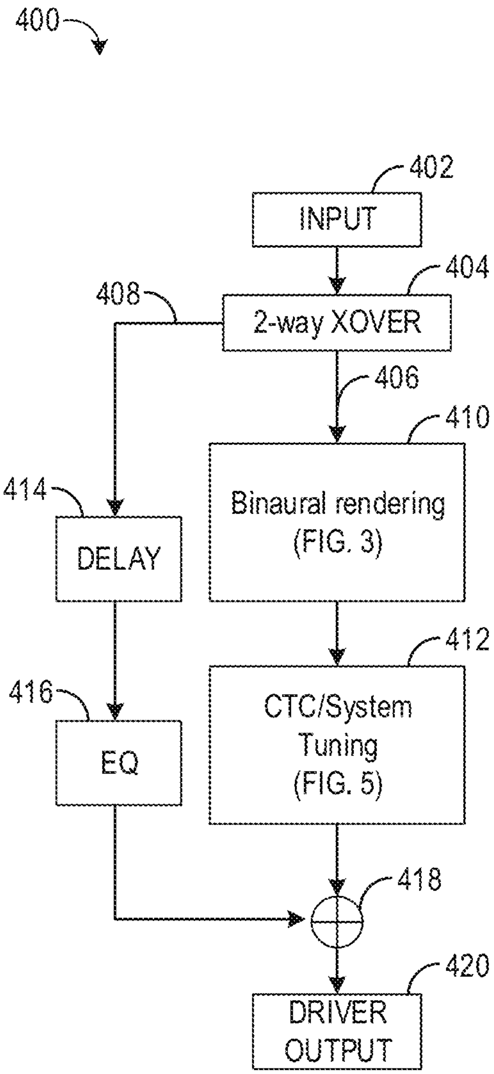
FIG. 4 shows a third flow diagram of a process of decomposing a signal in accordance with one or more embodiments of the present disclosure.
Figure 5:
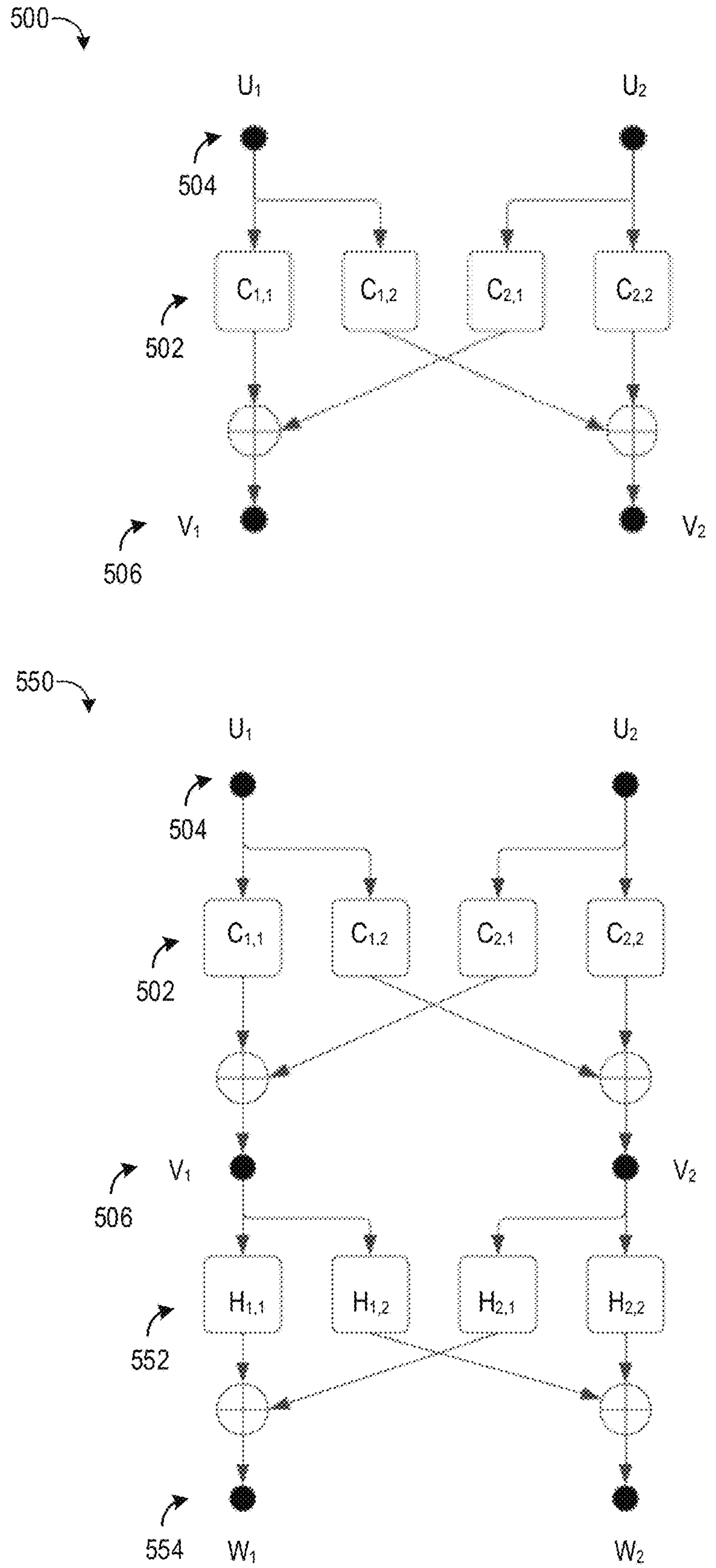
FIG. 5 shows a strategy for crosstalk cancellation in accordance with one or more embodiments of the present disclosure.
Figure 6:
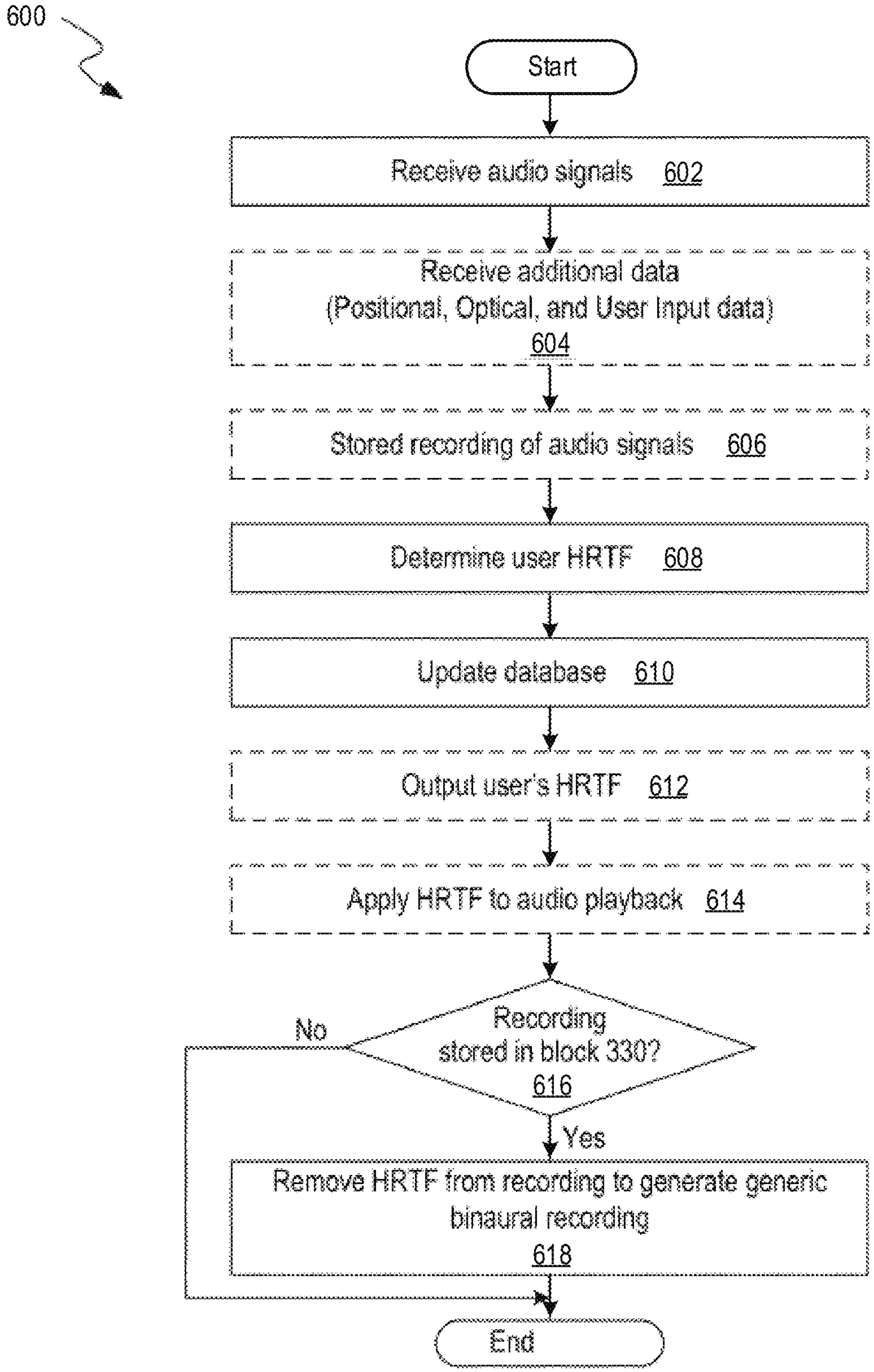
FIG. 6 shows a flow diagram of a method of determining a user's Head Related Transfer Function in accordance with one or more embodiments of the present disclosure.
Figure 7:
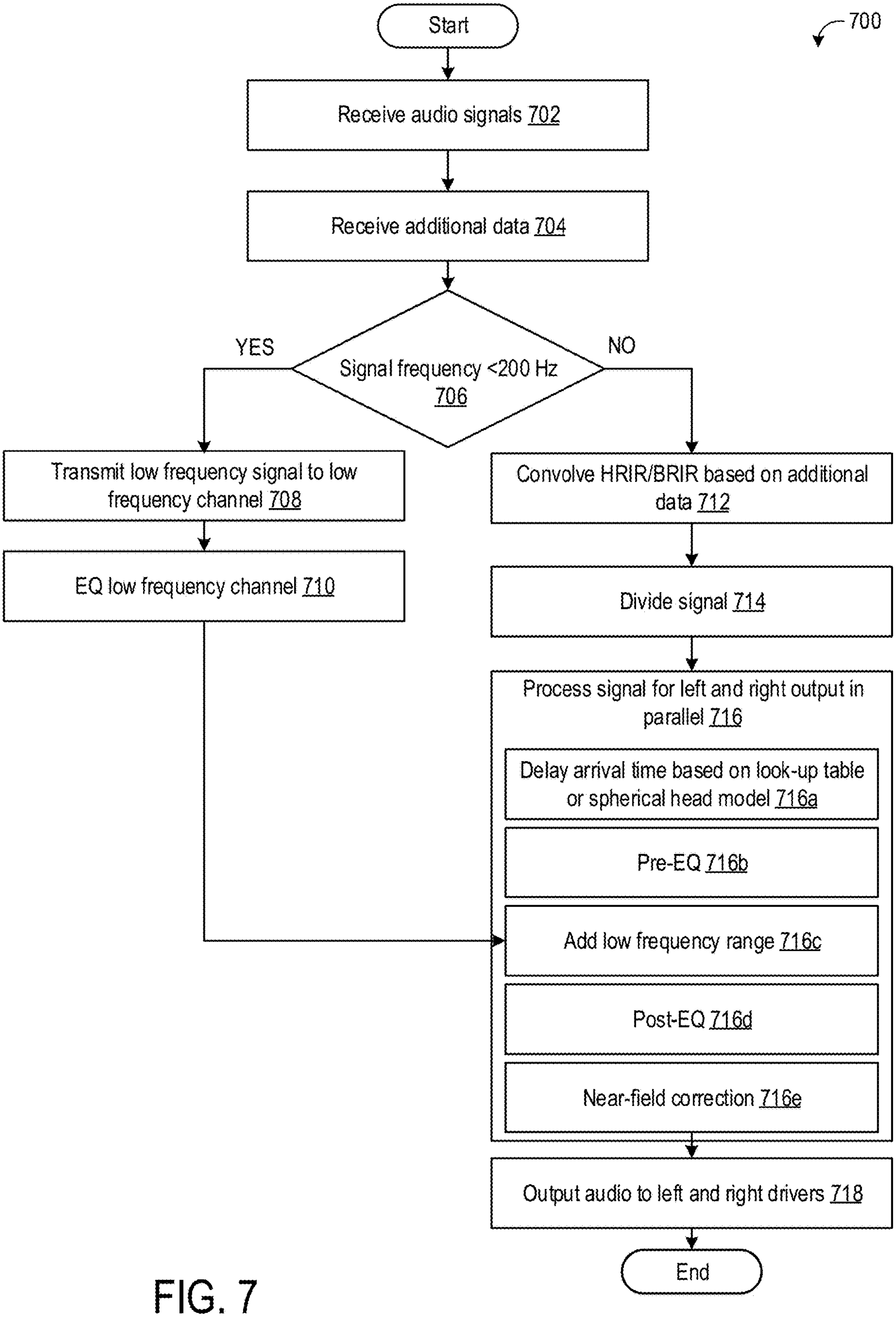
FIG. 7 shows a flow diagram of a first method of tuning personalized audio in accordance with one or more embodiments of the present disclosure.
Figure 8:
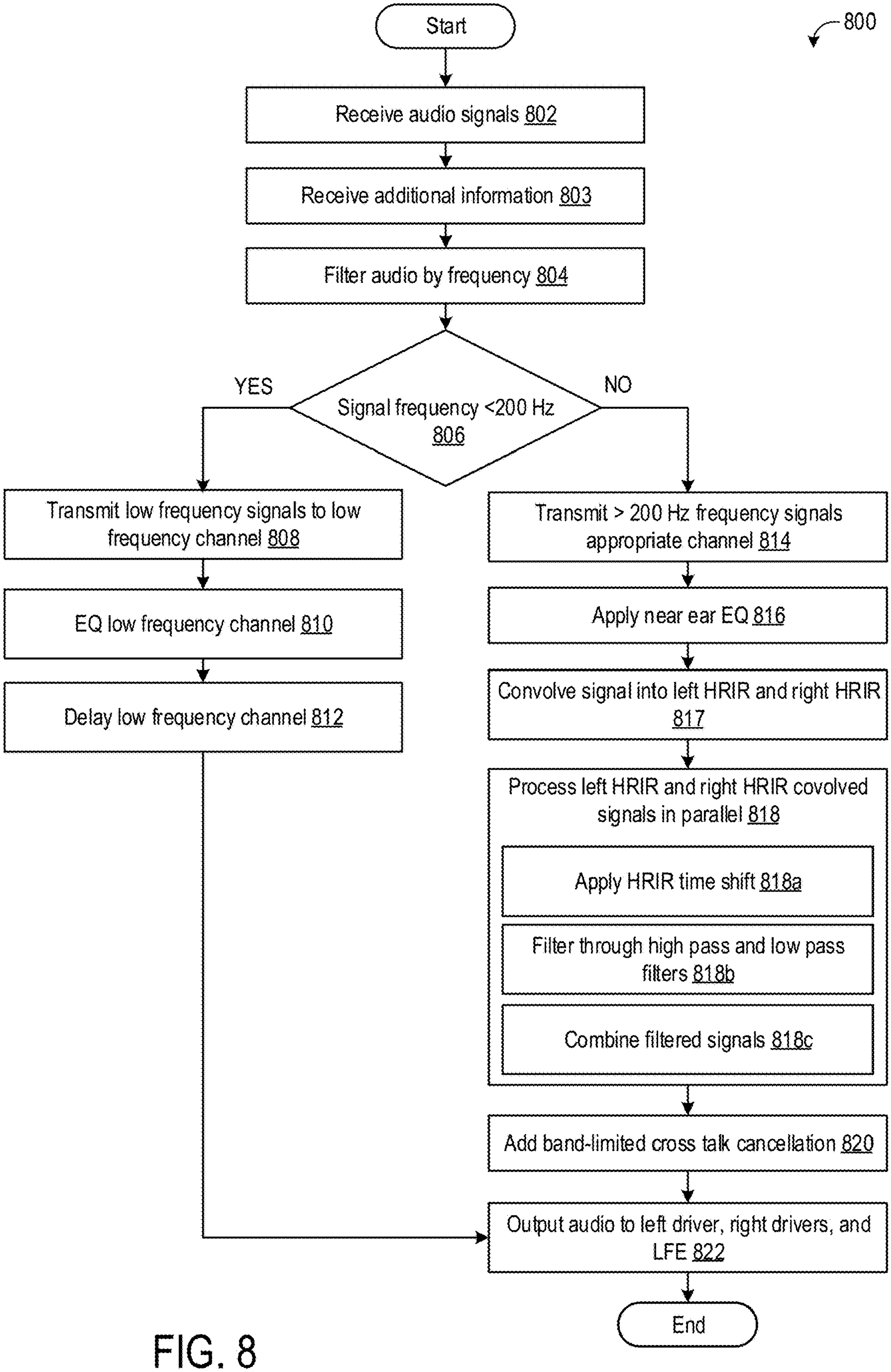
FIG. 8 shows a flow diagram of a second method of tuning personalized audio in accordance with one or more embodiments of the present disclosure.
Figure 9:
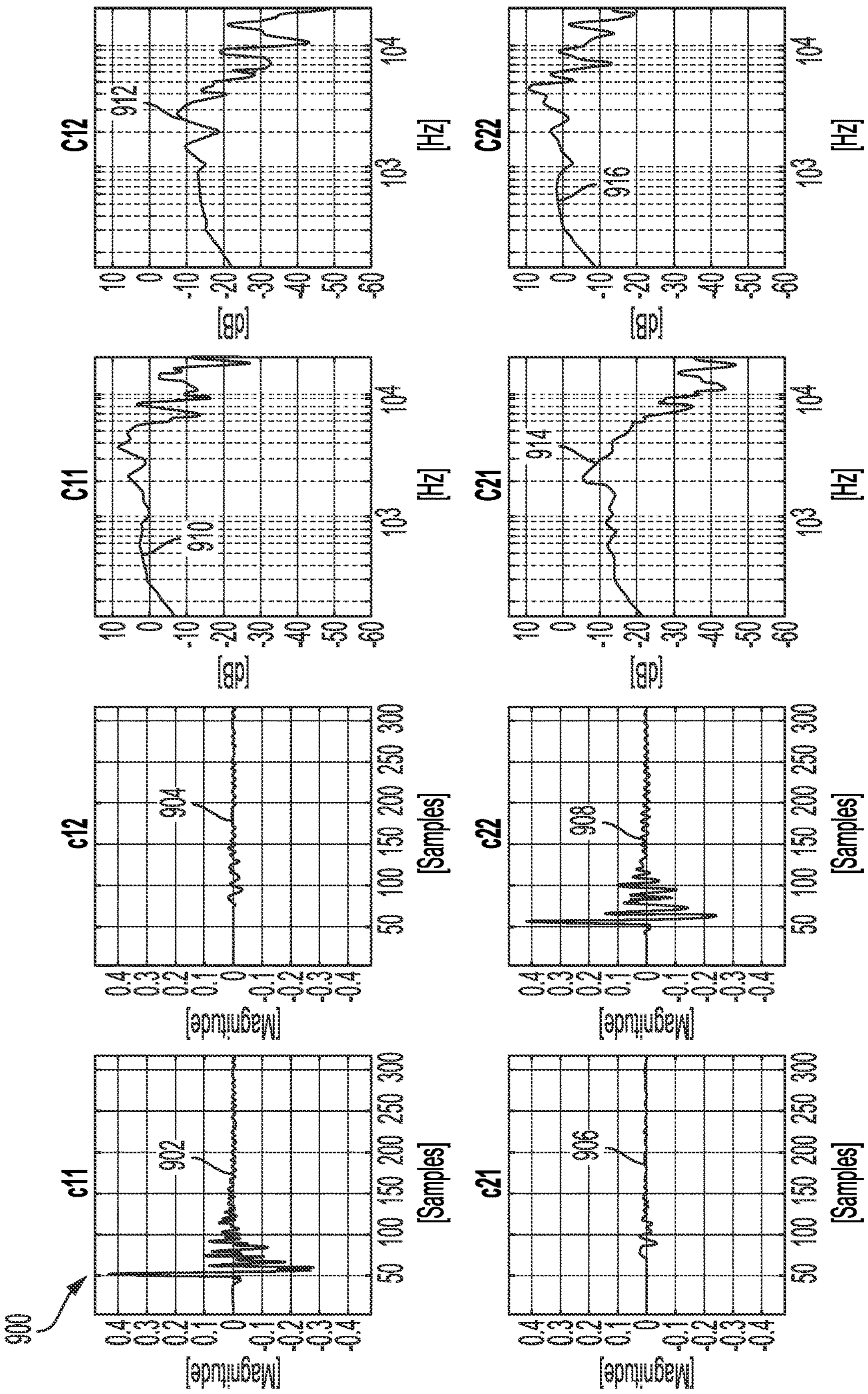
FIG. 9 shows an example of a C matrix in the time domain and the frequency domain representing an audio system in accordance with one or more embodiments of the present disclosure.
Figure 10:
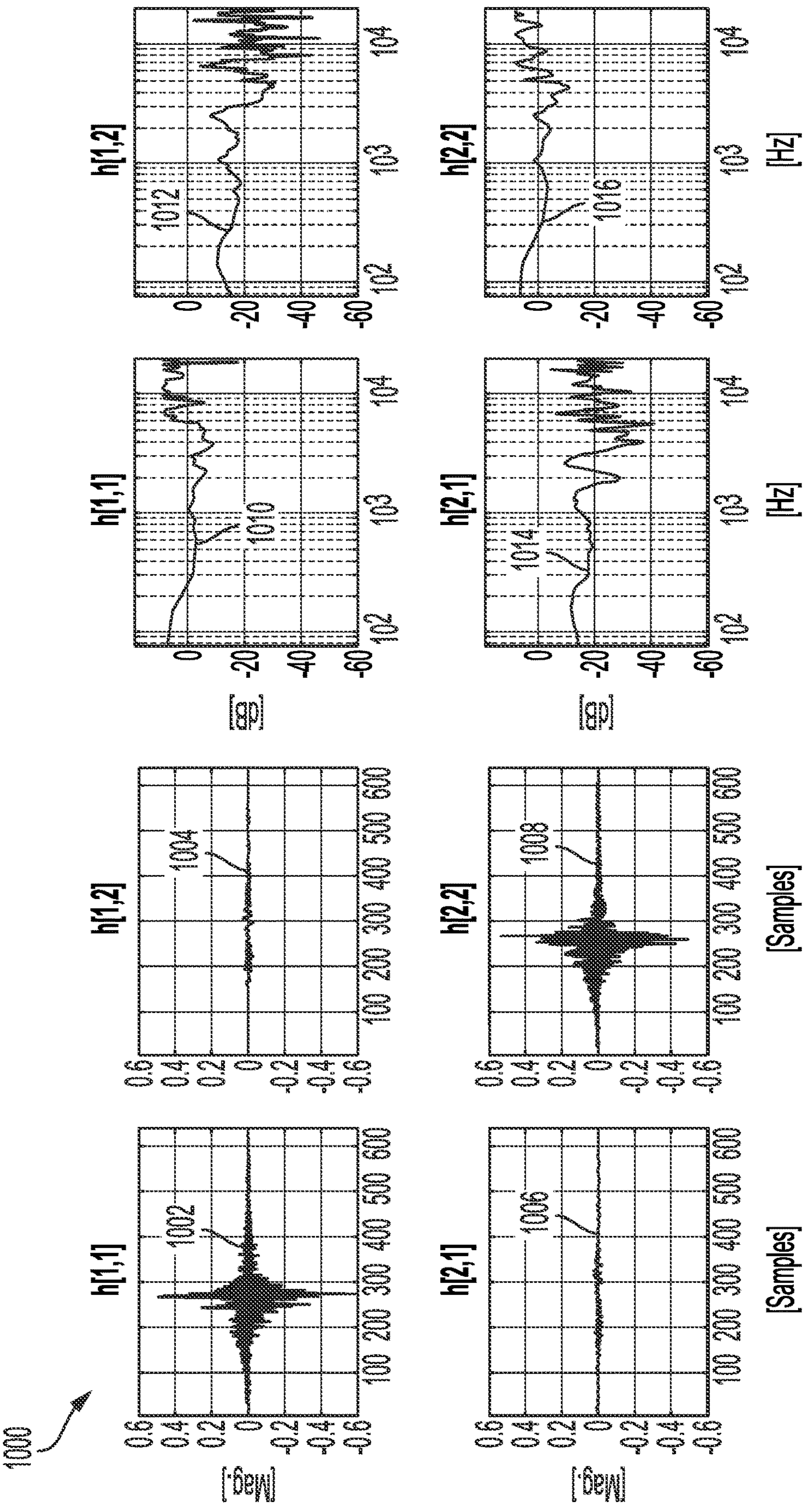
FIG. 10 shows an example of an H matrix in the time domain and the frequency domain designed to reduce crosstalk in accordance with one or more embodiments of the present disclosure.
Figure 11:
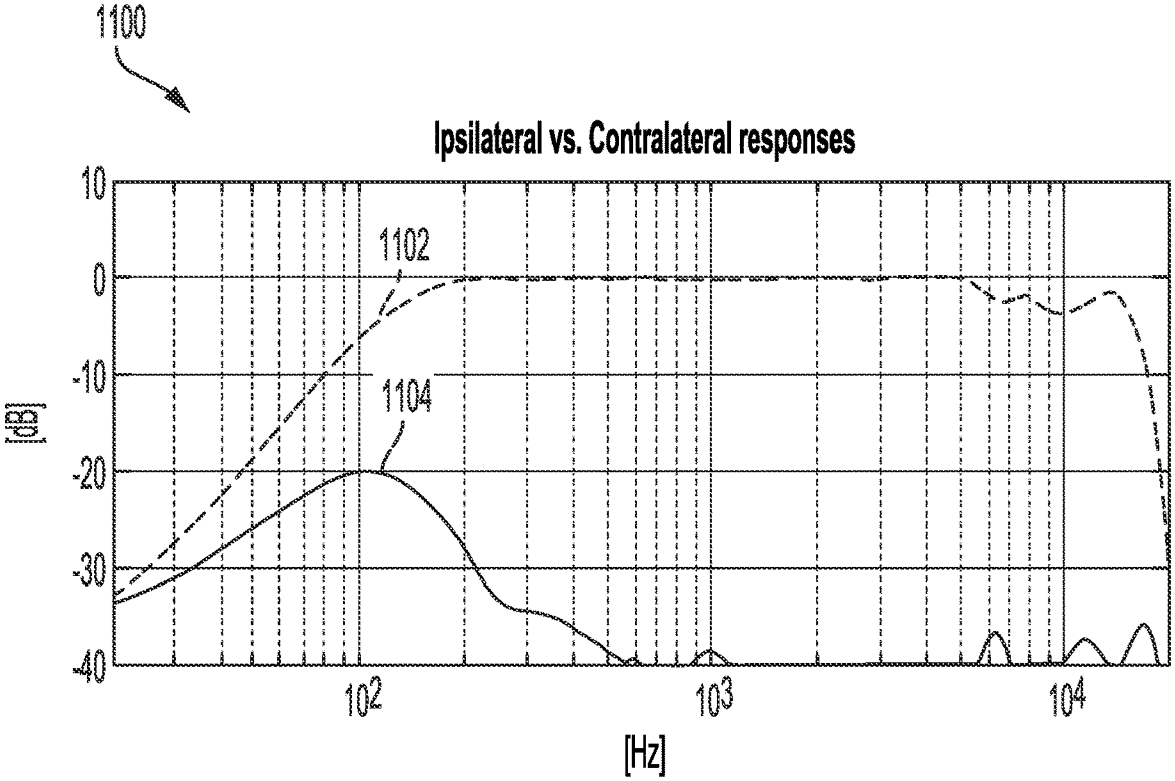
FIG. 11 shows first and second frequency response plots illustrating crosstalk cancellation in accordance with one or more embodiments of the present disclosure.
Figure 11:
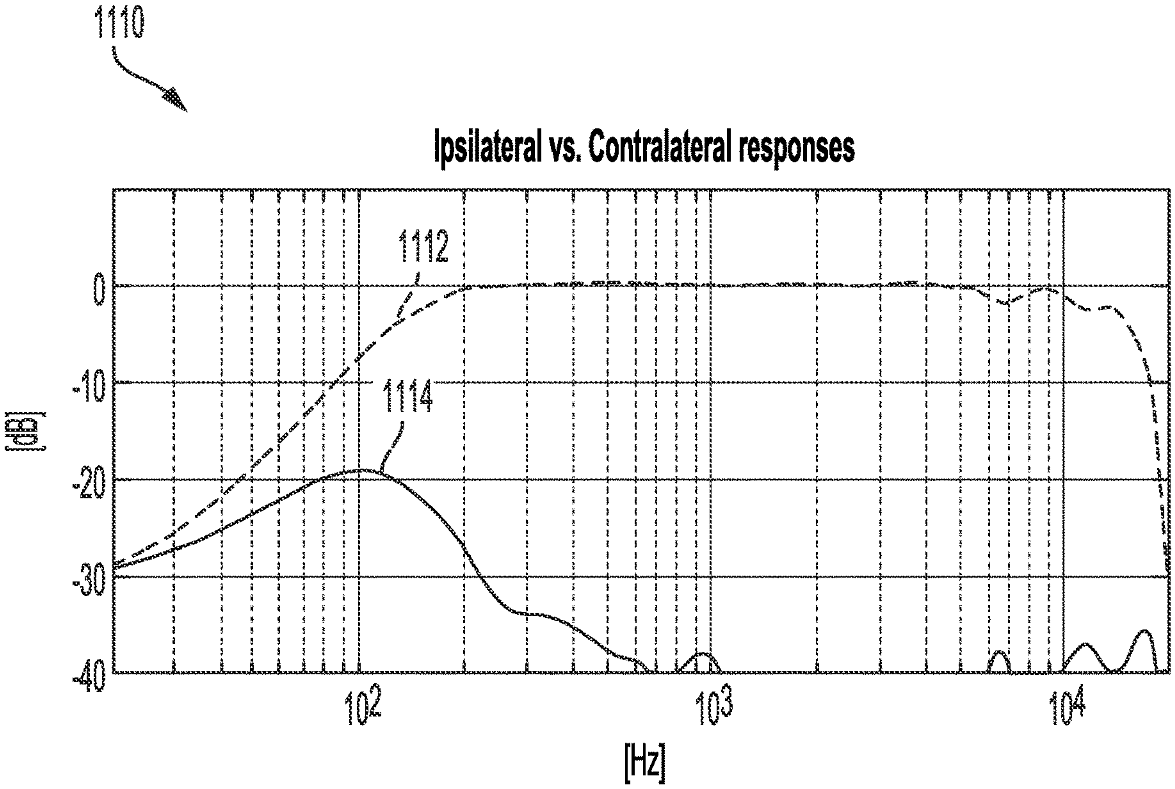

FIG. 1 shows an audio system 100 for personalized tuning. FIG. 2 shows a first example of a process for decomposing an input audio signal. FIG. 3 shows a second example of a process for decomposing an input audio signal in a personalized audio environment having speakers where a head of a user is free to move relative thereto. FIG. 4 shows a third example of a process for decomposing an input audio signal including binaural rendering and cross talk cancellation. FIG. 5 shows an example strategy for cancelling crosstalk in an audio system for personalized tuning. FIG. 6 shows a first method of determining a Head Related Transfer Function for a user. FIG. 7 shows a second method for signal processing for a personalized audio environment having speakers not mounted to the user's head. FIG. 8 shows a third method for signal processing for a personalized audio environment having speakers where a head of a user is free to move relative thereto. FIG. 9 shows an example of a C matrix illustrating acoustic transfer functions in a personalized audio environment. FIG. 10 shows an H matrix representing a set of filters H matrix designed to reduce crosstalk in the personalized audio system represented by the C matrix in FIG. 9. FIG. 11 shows first and second frequency response plots illustrating crosstalk cancellation achieved by processing the audio environment represented by the C matrix with the set of filters H.

FIG. 1 shows an audio system 100 for personalized audio calibration. The audio system 100 includes a listening device 102 in proximity of a user 101. The listening device 102 is communicatively coupled to a computer 110 for audio processing via a cable 107 and a communication link 112 (e.g., one or more wires, one or more wireless communication links, the Internet or another communication network). In one example, the listening device 102 may be a headrest sound system including headrest 103. The listening device 102 includes a pair of speakers 104. In one example, the speakers 104 may be headrest speakers. In one example, the pair of speakers 104 comprise a right speaker and a left speaker, which may output an audio signal to a left ear and a right ear of the user 101. In one example, user 101 may be a listener, a passenger, a driver, or other user of the headrest. The audio system 100 may include a plurality of speakers, of which the pair of speakers 104 is a part.

Each of the speakers 104 includes a corresponding microphone 106 thereon. The microphone 106 may be placed at a suitable location on the speakers 104 and the location shown in audio system 100 is one example of many suitable locations. In other examples, the microphone 106 may be placed in and/or on another location of the listening device. In some examples, the speakers 104 include one or more additional microphones 106 and/or microphone arrays. For example, in some embodiments, the speakers 104 include an array of microphones. In some embodiments, an array of microphones may include microphones located at any suitable location. For example, microphones may be disposed on the cable 107 of the listening device 102. The headrest sound system may further include a receiver or a plurality of receivers. In one example, the receiver or plurality of receivers may comprise a microphone or a plurality of microphones, such as the microphone 106.

A plurality of sound sources 122*a-d* (identified separately as a first sound source 122*a*, a second sound source 122*b*, a third sound source 122*c*, and a fourth sound source 122*d*) emit corresponding sounds toward the user 101. The corresponding sounds include sound 124*a*, sound 124*b*, sound 124*c*, and sound 124*d*. The sound sources 122*a-d* may include, for example, automobile noise, sirens, fans, voices, and/or other ambient sounds from the environment surrounding the user 101. In some embodiments, the audio system 100 optionally includes an additional speaker such as loudspeaker 126 coupled to the computer 110 and configured to output a known sound 127 (e.g., a standard test signal and/or sweep signal) toward the user 101 using an input signal provided by the computer 110 and/or another suitable signal generator. The loudspeaker may include, for example, a speaker in a mobile device, a tablet and/or any suitable transducer configured to produce audible and/or inaudible sound waves. In some embodiments, the audio system 100 includes an optical sensor or a camera 128 coupled to the computer 110. The camera 128 may provide optical and/or photo image data to the computer 110 for use in HRTF determination.

The computer 110 includes a bus 113 that couples a memory 114, processor 115, one or more sensors 116 (e.g., accelerometers, gyroscopes, transducers, cameras, magnetometers, galvanometers, head tracker), a database 117 (e.g., a database stored on non-volatile memory), a network interface 118 and a display 119. For example, one of sensors 116 may monitor and store the movement and orientation of the user's head in three-dimensional space. The head tracking data may be used as described herein to enhance the audio experience by adjusting the audio output based on the user's head position in real time. In the illustrated embodiment, the computer 110 is shown separate from the listening device 102. In other embodiments, however, the computer 110 may be integrated within and/or adjacent the listening device 102. Moreover, in the illustrated embodiment of FIG. 1, the computer 110 is shown as a single computer. In some embodiments, however, the computer 110 may comprise several computers including, for example, computers proximate the listening device 102 (e.g., one or more personal computers, a personal data assistants, a mobile devices, tablets) and/or computers remote from the listening device 102 (e.g., one or more servers coupled to the listening device via the Internet or another communication network). Various common components (e.g., cache memory) are omitted for illustrative simplicity.

The computer 110 is intended to illustrate a hardware device on which any of the components depicted in the example of FIG. 1 (and any other components described in this specification) may be implemented. The computer 110 may be of any applicable known or convenient type. In some embodiments, the computer 110 may include one or more server computers, client computers, personal computers (PCs), tablet PCs, laptop computers, set-top boxes (STBs), personal digital assistants (PDAs), cellular telephones, smartphones, wearable computers, home appliances, processors, telephones, web appliances, network routers, switches or bridges, and/or another suitable machine capable of executing a set of instructions (sequential or otherwise) that specify actions to be taken by that machine.

The processor 115 may include, for example, a conventional microprocessor such as an Intel microprocessor. One of skill in the relevant art will recognize that the terms "machine-readable (storage) medium" or "computer-readable (storage) medium" include any type of device that is accessible by the processor. The bus 113 couples the processor 115 to the memory 114. The memory 114 may include, by way of example but not limitation, random access memory (RAM), such as dynamic RAM (DRAM) and static RAM (SRAM). The memory may be local, remote, or distributed.

In one example, the computer 110 is a controller with computer readable instructions stored on the memory 114 that when executed cause the controller to generate personalized spatial audio using a head related impulse response (HRIR), the HRIR modified based on an input audio signal, an audio signal source location, a receiver location, and a head position of the user relative thereto. The instructions further cause the controller to produce audio output based on the HRIR and further based on interaural crosstalk cancellation filters filtering the input audio signal, wherein the HRIR and the interaural crosstalk cancellation filters are applied to frequencies greater than a first threshold frequency.

The bus 113 also couples the processor 115 to the database 117. The database 117 may include a hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 110. The database 117 may be local, remote, or distributed. The database 117 is optional because systems may be created with all applicable data available in memory. A typical computer system will usually include at least a processor, memory, and a device (e.g., a bus) coupling the memory to the processor. Software is typically stored in the database 117. Indeed, for large programs, it may not even be possible to store the entire program in the memory 114. Nevertheless, it should be understood that for software to run, if necessary, it is moved to a computer readable location appropriate for processing, and for illustrative purposes, that location is referred to as the memory 114 herein. Even when software is moved to the memory 114 for execution, the processor 115 will typically make use of hardware registers to store values associated with the software, and local cache that, ideally, serves to speed up execution. The bus 113 also couples the processor to the network interface 118. The network interface 118 may include one or more of a modem or network interface. It will be appreciated that a modem or network interface may be considered to be part of the computer system. The network interface 118 may include an analog modem, ISDN modem, cable modem, token ring interface, satellite transmission interface (e.g. "direct PC"), or other interfaces for coupling a computer system to other computer systems. The network interface 118 may include one or more input and/or output devices (I/O devices). The I/O devices may include, by way of example but not limitation, a keyboard, a mouse or other pointing device, disk drives, printers, and other input and/or output devices, including the display 119. The display 119 may include, by way of example but not limitation, a cathode ray tube (CRT), liquid crystal display (LCD), LED, OLED, or some other applicable known or convenient display device. For simplicity, it is assumed that controllers of any devices not depicted reside in the network interface.

In operation, the computer 110 may be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the database 117 and/or memory 114 and causes the processor 115 to execute the various acts required by the operating system to input and output data and to store data in the memory 114, including storing files on the database 117. In alternative embodiments, the computer 110 operates as a standalone device or may be connected (e.g., networked) to other machines. In a networked deployment, the computer 110 may operate in the capacity of a server or a client machine in a client-server network environment or as a peer machine in a peer-to-peer (or distributed) network environment.

FIG. 2 is a flow diagram depicting a process 200 for tuning audio using a user's HRTF/HRIR configured in accordance with embodiments of the disclosed technology. The process 200 may be executed in audio system for personalized audio calibration (e.g., audio system 100 of FIG. 1). The process 200 receives an audio signal input, identifies a location of the sound sources in the received signal, and calculates portions of the user's HRTF and spectral components related to the pinna. The calculated portions are combined to form a composite HRTF for the user, which may be applied to an audio signal for playback. The process 200 may include one or more instructions stored on memory and executed by a processor in a computer (e.g., the computer 110 of FIG. 1).

At block 210, the process 200 receives an audio signal from a signal source (e.g., a pre-recorded or live playback from a computer, wireless source, mobile device and/or another audio source).

At block 211, the process 200 determines location(s) of sound source(s) in the received signal. In one example, the location may be an audio signal source location. In one example, the location may be defined as a range, azimuth, and elevation with respect to the ear entrance point (EEP) or a reference point to the center of the head, between the ears, may be used for sources sufficiently far away that the differences in range, azimuth, and elevation between the left and right EEP are negligible. In other examples, the location of a source may be predefined, as for standard 5.1 and 7.1 channel formats, or may be of arbitrary positioning, dynamic positioning, or user defined positioning.

At block 212, the process 200 transforms the sound source(s) into location coordinates relative to the listener. This step allows for arbitrary relative positioning of the listener and source, and for dynamic positioning of the source relative to the user, such as for systems with head/positional tracking.

At block 213, the process 200 calculates a portion of the user's HRTF/HRIR using calculations based on the user's anatomy. The process 200 receives measurements related to the user's anatomy from one or more sensors positioned near and/or on the user. In some embodiments, for example, one or more sensors positioned on a listening device (e.g., the listening device 102 of FIG. 1) may acquire measurement data related to the anatomical structures (e.g., head size, orientation). The position data may also be provided by an external measurement device (e.g., one or more sensors) that tracks the listener and/or listening device, but is not necessary physically on the listening device. In the following, references to position data may come from any source except as their function is related specifically to an exact location on the device. The process 200 may process the acquired data to determine orientations and positions of sound sources relative to the actual location of the ears on the head of the user. For example, the process 200 may determine that a sound source is located at 30° relative to the center of the listener's head with 0° elevation and a range of 2 meters, but to determine the relative positions to the listener's ears, the size of the listener's head and location of ears on that head may be used to increase the accuracy of the model and determine HRTF/HRIR angles associated with the specific head geometry.

At block 214, the process 200 uses information from block 213 to scale or otherwise adjust the interaural level difference (ILD) and the interaural time difference (ITD) to create the portion of the user's HRTF relating to the user's head. A size of the head and location of the ears on the head, for example, may affect the path-length (time-of-flight) and diffraction of sound around the head and body, and ultimately what sound reaches the ears.

At block 215, the process 200 computes a spectral model that includes fine-scale frequency response features associated with the pinna to create HRTFs for each of the user's ears, or a single HRTF that may be used for both of the user's ears. Acquired data related to the anatomy of the user received at block 213 may be used to create the spectral model for these HRTFs. The spectral model may also be created by placing transducer(s) in the near-field of the ear, and reflecting sound off of the pinna directly.

At block 216, the process 200 allocates processed signals to the near and far ear to utilize the relative location of the transducers to the pinnae.

At block 217, the process 200 calculates a range or distance correction to the processed signals that may compensate for additional head shading in the near-field, differences between near-field transducers and sources at larger range, and/or may be applied to correct for reference point at the center of the head versus the ear entrance reference. The process 200 may calculate the range correction, for example, by applying a predetermined filter to the signal and/or including reflection and reverberation cues based on environmental acoustics information (e.g., based on a previously derived room impulse response). For example, the process 200 may utilize impulse responses from real sound environments or simulated reverberation or impulse responses with different HRTF's applied to the direct and indirect (reflected) sound, which may arrive from different angles. In the illustrated embodiment of FIG. 2, block 217 is shown after block 216. In other embodiments, however, the process 200 may include range correction(s) at any of the blocks shown in FIG. 2 and/or at one or more additional steps not shown. Moreover, in other embodiments, the process 200 may not include a range correction calculation step.

At block 218, the process 200 combines portions of the HRTFs calculated at blocks 213, 214, 215, 216, and 217 to form a composite HRTF for the user. The composite HRTF may be applied to an audio signal that is output to a listening device. In some embodiments, processed signals may be transmitted to a listening device (e.g., the listening device 102 of FIG. 1) for audio playback. In other embodiments, the processed signals may undergo additional signal processing (e.g., signal processing that includes filtering and/or enhancement of the processed signals) prior to playback. For example, the composite HRTF/HRIR may be implemented in the signal processing approaches described with reference to FIGS. 3-5.

FIG. 3 is a flow diagram of a process 300 for tuning audio using a user's HRTF/HRIR configured in accordance with embodiments of the disclosed technology. In one example, the flow diagram represents a process that may be executed in audio system for personalized audio calibration (e.g., audio system 100 of FIG. 1). In one example, the process 300 calibrates tuning parameters for an audio system including speakers that are not mounted to the user's head. In other words, the user's head is free to move relative to a speaker position. The process 300 may include one or more instructions stored on memory and executed by a processor in a computer (e.g., the computer 110 of FIG. 1).

At block 302, the process 300 receives an input audio signal from a signal source (e.g., a pre-recorded or live playback from a computer, wireless source, mobile device and/or another audio source). In one example, the input audio signal may be a first channel. The process 300 receives a location of the first channel at block 304. In one example, the location may be defined as a range, azimuth, and elevation with respect to the ear entrance point (EEP) or a reference point to the center of the head, between the ears, may be used for sources sufficiently far away that the differences in range, azimuth, and elevation between the left and right EEP are negligible. In other examples, the location of a source may be predefined, as for standard 5.1 and 7.1 channel formats, or may be of arbitrary positioning, dynamic positioning, or user defined positioning. In one example, the location may be an audio signal source location.

Head position of a user (e.g., a listener, a passenger, a driver) is stored as a head tracker input at block 306. In one example, the head position may be determined based on one or more sensor signals, such as captured by one of sensors 116 in FIG. 1.

At block 332, the process 300 updates a frame of reference stored by a location engine based on the head position of the user and the audio signal source location.

An array of time aligned head related impulse responses corresponding to one or more locations around the user is stored as an input at block 334. In one example, the HRIRs comprising the array may be obtained based on the approach described with reference to FIG. 2. In one example, the array of time aligned HRIR corresponding to one or more locations around the user may be prepared by selecting the finite impulse response (FIR). The FIR represents an HRIR with the maximum delay as a reference FIR. All other FIRs may be aligned to the reference FIR.

At block 336, the process 300 interpolates the HRIR to a desired location based on the updated frame of reference and the array of time aligned HRIR at locations. The interpolated HRIR is transmitted to block 310 for convolving HRIR/BRIR (binaural room impulse response). In some examples, the array of time aligned HRIR may be a dataset of HRTF, BRIR, or HRTF pre-convolved with a reverb model to simulate a set of BRIR.

At block 338, the process 300 obtains an arrival time. Inputs for determining the arrival time may include the updated frame of reference stored by the location engine. In one example, the arrival time may be stored in a look-up table. For example, the process may include performing interaural time difference measurements for a reference subject and storing the delay values in the look-up table. In another example, the arrival time may be based on a continuous spherical head model. For example, the spherical model of a head may be obtained by considering a human head as a sphere and ears of the human head as points over the sphere. Given a sound source in space, the distance to the points representing the ears may be calculated, and given the speed of sound, a time of arrival differential between the ears may be calculated.

Returning to the input audio signal at 302, the process 300 may continue to block 308. At block 308, the process 300 includes splitting the input audio signal into high and low frequency ranges. In one example, the high and low frequency range signals are processed in parallel and recombined downstream. The low frequency range signal (e.g., greater than 200 Hz) is transmitted to a low frequency effects (LFE) channel at block 340.

At block 310, the process 300 convolves HRIR and/or BRIR. In one example, convolution of the input audio signal with the HRIR and/or BRIR may produce an HRIR convolved high frequency output. Various convolution methods may be implemented to convolve HRIR and/or BRIR. As one example, the process 300 may split the FIR filter into sub-blocks that are a similar size as the audio buffer and performs a fast Fourier transform (FFT) on each sub-block. Each audio input buffer is then processed with an FFT and convolved with each sub-block of the FIR filter. The HRIR and/or BRIR measurements that are combined at block 310 are derived in the aforementioned spatial processes based on the head tracker, audio signal source location, and array of time aligned HRIR at locations inputs.

After convolving HRIR and/or BRIR measurements, the HRIR convolved high frequency output may undergo additional signal processing in two parallel phases. For example, the process may divide the HRIR convolved high frequency output into a left output and a right output.

Turning to the first phase, at block 312, the process 300 delays right side arrival time of the right output. For example, the amount of arrival time delay may be determined based on the lookup table or spherical head model described above with reference to block 338. Arrival time delay represents reconstruction of the interaural level difference in the process 300.

At block 314, the process 300 applies right side pre-equalizing to the right output.

At block 315, the process 300 recombines the signal from the LFE channel with the right output. Prior to recombination of the LFE signal at block 315, the LFE signal is processed with LFE equalizing at block 342. In one example, equalizing includes adjusting the signal using biquad filters. For one example, the process 300 may include applying a low-shelf filter to flatten the response of the system at low frequency or to emphasize the low frequency range.

At block 316, the process 300 applies right side post-equalizing to the right output.

At block 318, the process 300 applies near-field correction to the right output. In one example, near-field correction or compensation can be implemented by measuring the head related transfer functions at distances below one meter all around a subject and then model the behavior of the frequency response as the measurement source gets closer to the user. For example, the behavior may be modeled using a low shelf filter and a high shelf filter that have settings depending on the azimuth, elevation, and distance of a virtual source to the user. In some examples, near-field correction may include frequency domain shaping and/or gain for virtual and augmented reality audio environments at block 344.

At block 320, the processed right output is output to a right channel. In one example, the right output may undergo additional signal processing (e.g., signal processing that includes filtering and/or enhancement of the processed signals) prior to playback, such as described below with reference to FIGS. 4-5. In other examples, the process may output the right output to a right driver of an audio system (e.g., one or more of the speakers 104 of FIG. 1) for audio playback.

Turning to the second phase, the left output may be processed similarly as described above with reference to the right output. For example, at block 322, the process 300 delays left side arrival time of the signal.

At block 324 the process 300 applies left side pre-EQ to the left output.

At block 325, the process 300 recombines the LFE signal from the LFE channel with the left output.

At block 326, the process 300 applies left side post-EQ to the left output.

At block 328, the process 300 applies near-field correction to the left output.

At block 330, the processed left output is output to a left channel. As described with reference to the right output, the left output may undergo additional signal processing prior to playback, such as described below with reference to FIGS. 4-5. In other examples, the process may output the signal to a left driver of an audio system (e.g., one or more of the speakers 104 of FIG. 1) for audio playback.

FIG. 4 is an example of a process 400 for tuning audio using a user's HRTF/HRIR and interaural cross talk cancellation configured in accordance with embodiments of the disclosed technology. In one example, the flow diagram represents a process that may be executed in audio system for personalized audio calibration (e.g., audio system 100 of FIG. 1). The process 400 calibrates tuning parameters for an audio system including speakers that are not mounted to the user's head. In one example, interaural crosstalk cancellation may be added to virtually isolate each ear. Crosstalk cancellation may be band-limited at high frequencies when natural separation between each ear of the user is high enough. The process 400 may include one or more instructions stored on memory and executed by a processor in a computer (e.g., the computer 110 of FIG. 1).

At 402, the process 400 receives an input audio signal from an audio signal source (e.g., a pre-recorded or live playback from a computer, wireless source, mobile device and/or another audio source).

At 404, a two-way crossover strategy is used to split the incoming audio signal into separate high frequency and low frequency bands. In one example, the process 400 may include applying a high pass filter that separates frequencies above a first threshold frequency into a high frequency band 406 and a low pass filter that separates frequencies below the first threshold frequency into a low frequency band 408. In one example, the first threshold frequency is a positive, non-zero threshold.

At 410, the process 400 applies binaural rendering to the high frequency band. The binaural rendering strategy may be the same or similar as described with reference to FIG. 3. For example, the binaural rendering strategy may include convolving the high frequency band with HRIR to produce an HRIR convolved high frequency output, dividing the HRIR convolved high frequency output into a left output and a right output, and additional signal processing of the left output and the right output.

At 412, the process 400 applies interaural crosstalk cancellation filters and system tuning to the audio signals processed with binaural rendering. For example, the interaural crosstalk filters may be applied to the HRIR convolved high frequency output to produce a crosstalk filtered high frequency output. An exemplary crosstalk cancellation strategy is described in detail below with reference to FIG. 5. Briefly, crosstalk cancellation may be achieved by determining a set of filters with a focus on achieving a desired response at the entrance of the ears. In one example, the approach may include band limiting the crosstalk cancellation at high frequencies when the natural separation between the ears is high enough. However, such an approach may not be appropriate for mid to low frequencies and the channel separation may depend on the application. Generally, the system may target as much CTC and be as broadband as possible given the perceptual constraints of the system. For example, a system with very high CTC and no head tracking may be more sensitive to user displacement. In which case, maximizing CTC would produce a narrower sweet spot for the system, which may be very noticeable for the user and thus undesirable. As a few non-limiting examples, the system tuning may further include a flat frequency response at the entrance of the ear canal with maximum crosstalk rejection. Some EQ adjustments may be presets to emulate the overall frequency response of a room or to change the tonal balance on a BRIR dataset.

Turning now to the low frequency band, at 414 the process 400 applies delay to the low frequency band 408. The amount of delay added to the low frequency band may be based on various parameters such as characteristics of the audio system and user preferences. At 416, the process 400 equalizes for the low frequency band. EQ adjustments to the low frequency band may include the same or similar approaches as described with reference to FIG. 3, or other approaches. In one example, the low frequency channel subsequent to the application of delay and equalizing may be referred to as a filtered low frequency output.

At 418, the process 400 combines the filtered low frequency band and the crosstalk filtered high frequency band.

At 420, the process produces an audio output based on the combined filtered signal. For example, the audio output may be played through one or more of the speakers 104 of FIG. 1.

FIG. 5 shows a first diagram 500 and a second diagram 550, respectively, illustrating an approach for cancelling crosstalk, such described above with reference to FIG. 4. Diagram elements introduced with reference to the first diagram 500 that are the same in the second diagram 550 may be referenced without reintroduction.

Turning the first diagram 500, a matrix C represents acoustic transfer functions from m number of speakers to n number of points in space. The points in space may be, but are not limited to, the blocked entrance of the ear canal. For two ears, n=2. For the matrix $C_{m*n}$, where m=2 and n=2, the elements where m=n represent the ipsilateral transfer function. The elements where m≠n represent the contralateral transfer function, which is also known as crosstalk. The matrix C as represented in the first diagram 500 is indicated by arrow 502. A set of filters H may be solved for so that the target response at the entrance of the ears has a desired response w.

In the first diagram 500, u represents the acoustic output of the system, indicated by arrow 504, and v represents the signals at the entrance of the ear canal, indicated by arrow 506. The basic problem to solve is to find the set of filters H so that:

$$CH=B,$$

where B is an arbitrary target function. For a simple cross-talk canceller:

$$B=I,$$

where I is the identity matrix. In one example, the identity matrix I may represent an ideal scenario where each ear receives only the intended signal without interference from the other channel, or in other words, perfect isolation between the right and left ears. The diagonal terms of the identify matrix I may additionally, or alternatively, be a desired HRTF target response. In this way, the crosstalk canceller may be a transaural renderer.

Turning to the second diagram 550, a process represented by CH is shown. The set of filters H is represented in the diagram is indicated by arrow 552. When the arbitrary target function B is equal to the identity matrix I, the desired response w is equal to the signal at the entrance of the ear canal u. Or, when B=I, u=w. The desired response w is indicated by arrow 554 in the second diagram 550.

Acoustic systems represented by the matrix C are ill-conditioned such that $C^{-1}=H$ is not realizable, as obtaining the aforementioned state would demand very high gains at very low and very high frequencies together with whatever high gain, high quality (q-factor) resonances that may be part of the response. To avoid direct inversion of an ill-conditioned system, such as the matrix C, there are several techniques that may be implemented. For example, any one or more of pseudo-inverse, regularized inverse, frequency-dependent regularization, and LMS filters with an arbitrary penalty function may be implemented. It should be noted that the aforementioned techniques are not exhaustive and other methods may be used to obtain a desired behavior of the filters H.

Turning briefly to FIGS. 9-11, plots are illustrated showing examples of a C matrix in the time domain and frequency domain, a set of filters H for the C matrix, and crosstalk cancellation resulting from CH=I, where I is the identity matrix. FIG. 9 is an example of crosstalk in a real system, such as indicated by arrow 502 in FIG. 5. FIG. 10 represents filters H that correspond to the measurements illustrated by FIG. 9, such as indicated by arrow 552 in FIG. 5. Applying the set of filters H illustrated by FIG. 10 to the C matrix illustrated by FIG. 9 produces the results shown in FIG. 11.

FIG. 9 shows a C matrix 900 illustrating acoustic transfer functions for an audio system comprising two audio signal output sources and two points in space. For example, the C matrix may represent transfer functions from the two speakers 104 to the two ears of the user 101 in audio system 100 of FIG. 1. A first plot 902, a second plot 904, a third plot 906, and a fourth plot 908 illustrate the C matrix in the time domain where signal intensity in magnitude is plotted on the y-axis and samples on the x-axis. A fifth plot 910, a sixth plot 912, a seventh plot 914, and an eighth plot 916 illustrate the C matrix in the frequency domain where signal intensity in decibels (dB) is plotted on the y-axis and frequency in Hertz (Hz) is plotted on the x-axis. The first plot 902 and the fifth plot 910 illustrate acoustic transfer function from the first speaker to the first ear (e.g., $C_{11}$). The second plot 904 and the sixth plot 912 illustrate the acoustic transfer function from the first speaker to the second ear (e.g., $C_{12}$). The third plot 906 and the seventh plot 914 illustrate the acoustic transfer function from the second speaker to the first ear (e.g., $C_{21}$). The fourth plot 908 and the eighth plot 916 illustrate the acoustic transfer function from the second speaker to the second ear (e.g., $C_{22}$).

FIG. 10 shows a H matrix 1000 illustrating a set of filter transfer functions that may be applied to the C matrix 900 to achieve a desired response. For example, the filter transfer functions illustrated by the H matrix 1000 may be implemented to reduce crosstalk between the two speakers 104 and the two ears of the user 101 in audio system 100 of FIG. 1. A first plot 1002, a second plot 1004, a third plot 1006, and a fourth plot 1008 illustrate the H matrix in the time domain where signal intensity in magnitude is plotted on the y-axis and samples on the x-axis. A fifth plot 1010, a sixth plot 1012, a seventh plot 1014, and an eighth plot 1016 illustrate the H matrix in the frequency domain where signal intensity in decibels (dB) is plotted on the y-axis and frequency in Hertz (Hz) is plotted on the y-axis. The first plot 1002 and the fifth plot 1010 illustrate the filter transfer function that may be combined with the acoustic transfer function from the first speaker to the first ear (e.g., $H_{11}$). The second plot 1004 and the sixth plot 1012 illustrate the filter transfer function that may be combined with the acoustic transfer function from the first speaker to the second ear (e.g., $H_{12}$). The third plot 1006 and the seventh plot 1014 illustrate the filter transfer function that may be combined with the acoustic transfer function from the second speaker to the first ear (e.g., $H_{21}$). The fourth plot 1008 and the eighth plot 1016 illustrate the filter transfer function that may be combined with the acoustic transfer function from the second speaker to the second ear (e.g., $C_{22}$).

FIG. 11 shows an example of acoustic crosstalk cancellation resulting from applying a realizable set of filters so that CH≈I, where I is the identity matrix. In the example, the set of filters illustrated in the H matrix 1000 are multiplied by the acoustic transfer functions illustrated in the C matrix 900 to obtain a desired outcome w. In the example, the filters are obtained based on a method comprising frequency dependent regularization for system inversion. The example shows an upper graph 1100 and a lower graph 1110 plotting an ipsilateral response for a first desired response w1 and a second desired response w2. Signal intensity in decibels (dB) is plotted on the y-axis and frequency in Hertz (Hz) is plotted on the y-axis.

Upper graph 1100 illustrates an ipsilateral response 1102 for a first desired response w1 and a contralateral response 1104 for a second desired response w2. As can be seen, by multiplying the matrix C by the matrix H, the loudness of the contralateral response 1104, or crosstalk, is reduced. Similarly, lower graph 1110 illustrates an ipsilateral response 1112 for the second desired response w2 and a contralateral response 1114 for the first desired response w1. By multiplying the matrix C by the matrix H, the loudness of the contralateral response 1114 is reduced.

FIG. 6 is a flow chart of method 600 for determining a user's HRTF configured in accordance with embodiments of the disclosed technology. The method 600 may include one or more instructions or operations stored on memory (e.g., the memory 114 or the database 117 of FIG. 1) and executed by a processor in a computer (e.g., the processor 115 in the computer 110 of FIG. 1). The method 600 may be used to determine a user's HRTF based on measurements performed and/or captured in an anechoic and/or non-anechoic environment. In one embodiment, for example, the method 600 may be used to determine a user's HRTF using ambient sound sources in the user's environment in the absence of an input signal corresponding to one or more of the ambient sound sources. In a non-limiting example, the process 200 may be carried out according to the method 600.

At 602, the method 600 receives electric audio signals corresponding to sound energy acquired at one or more transducers (e.g., one or more of the sensors 116 on the listening device 102 of FIG. 1). The audio signals may include audio signals received from ambient noise sources (e.g., the sound sources 122*a-d* of FIG. 1) and/or a predetermined signal generated by the method 600 and played back via a loudspeaker (e.g., the loudspeaker 126 of FIG. 1). Predetermined signals may include, for example, standard test signals such as a Maximum Length Sequence (MLS), a sine sweep and/or another suitable sound that is "known" to the algorithm.

At 604, the method 600 optionally receives additional data from one or more sensors (e.g., the sensors 116 of FIG. 1), such as, the location of the user and/or one or more sound sources. In one embodiment, the location of sound sources may be defined as range, azimuth, and elevation (r, theta, phi) with respect to the ear entrance point (EEP) or a reference point to the center of the head, between the ears, may also be used for sources sufficiently far away such that the differences in (r, theta, phi) between the left and right EEP are negligible. In other embodiments, however, other coordinate systems and alternate reference points may be used. Further, in some embodiments, a location of a source may be predefined, as for standard 5.1 and 7.1 channel formats. In some other embodiments, however, the sound sources may be arbitrarily positioned, have dynamic positioning, or have a user-defined positioning. In some embodiments, the method 600 receives optical image data (e.g., from the camera 128 of FIG. 1) that includes photographic information about the listener and/or the environment. This information may be used as an input to the method 600 to resolve ambiguities and to seed future datasets for prediction improvement. In some embodiments, the method 600 receives user input data that includes, for example, the user's height, weight, length of hair, glasses, shirt size, and/or hat size. The method 600 may use this information during HRTF determination.

At 606, the method 600 optionally records the audio data acquired at 602 and stores the recorded audio data into a suitable mono, stereo and/or multichannel file format (e.g., mp3, mp4, way, OGG, FLAG, ambisonics, Dolby Atmos®, etc.). The stored audio data may be used to generate one or more recordings (e.g., a generic spatial audio recording). In some embodiments, the stored audio data may be used for post-measurement analysis.

At 608, the method 600 computes at least a portion of the user's HRTF using the input data from 602 and (optionally) 604. In one example, the method 600 may use available information about the microphone array geometry, positional sensor information, optical sensor information, user input data, and characteristics of the audio signals received at 602 to determine the user's HRTF or a portion thereof.

At 610, HRTF data is stored in a database as either raw or processed HRTF data (e.g., the database 117 of FIG. 1). The stored HRTF be used to seed future analysis, or may be reprocessed in the future as increased data improves the model over time. In some embodiments, data received from the microphones at 602 and/or the sensor data from 604 may be used to compute information about the room acoustics of the user's environment, which may also be stored by the method 600 in the database. The room acoustics data may be used, for example, to create realistic reverberation models as discussed above in reference to FIG. 2.

At 612, the method 600 optionally outputs HRTF data to a display (e.g., the display 119 of FIG. 1) and/or to a remote computer (e.g., via the network interface 118 of FIG. 1).

At 614, the method 600 optionally applies the HRTF from 608 to generate spatial audio for playback. The HRTF may be used for audio playback on the original listening device or may be used on another listening device to allow the listener to playback sounds that appear to come from arbitrary locations in space.

At 616, the process confirms whether recording data was stored at 606. If recording data is available, the method 600 proceeds to 616. Otherwise, the method 600 ends at 614. At 618, the method 600 removes specific HRTF information from the recording, thereby creating a generic recording that maintains positional information. Binaural recordings typically have information specific to the geometry of the microphones.

For measurements done on an individual, this may mean the HRTF is captured in the recording and is perfect or near perfect for the recording individual. However, the recording will be encoded with the incorrect for the HRTF for another listener. To share experiences with another listener via either loudspeakers or headphones, the recording may be made generic.

FIG. 7 is a flow chart of a method 700 of tuning personalized audio in in accordance with embodiments of the disclosed technology. The method 700 may include one or more instructions or operations stored on memory (e.g., the memory 114 or the database 117 of FIG. 1) and executed by a processor in a computer (e.g., the processor 115 in the computer 110 of FIG. 1). The method 700 may be used to tune an immersive audio experience using a user's HRTF/HRIR based on measurements performed and/or captured in an anechoic and/or non-anechoic environment and including signal processing for fixed speakers not mounted on the head. In a non-limiting example, the process 300 may be carried out according to the method 700.

At 702, the method 700 includes receiving audio signals corresponding to sound energy acquired at one or more transducers (e.g., one or more of the microphones 106 and/or sensors 116 on the listening device 102 of FIG. 1). The audio signals may include audio signals received from ambient noise sources (e.g., the sound sources 122*a-d* of FIG. 1) and/or a predetermined signal generated by the method 700 and played back via a loudspeaker (e.g., the loudspeaker 126 of FIG. 1). Predetermined signals may include, for example, standard test signals such as a Maximum Length Sequence (MLS), a sine sweep and/or another suitable sound that is "known" to the algorithm.

At 704, the method 700 includes receiving additional data from one or more sensors (e.g., the sensors 116 of FIG. 1), such as, the location of the head of the user via a head tracker sensor and the location of one or more sound sources. In one embodiment, the location of sound sources may be defined as range, azimuth, and elevation (r, theta, phi) with respect to the ear entrance point (EEP) or a reference point to the center of the head, between the ears, may also be used for sources sufficiently far away such that the differences in (r, theta, phi) between the left and right EEP are negligible. In other embodiments, however, other coordinate systems and alternate reference points may be used. Further, in some embodiments, a location of a source may be predefined, as for standard 5.1 and 7.1 channel formats. In some other embodiments, however, the sound sources may be arbitrarily positioned, have dynamic positioning, or have a user-defined positioning. The additional information may include an array of time aligned HRIR at various locations in the audio environment. The additional data may include a frame of reference stored in a location engine. The additional data may include a plurality of arrival time delays stored in a look-up table. In another example, the additional information includes a spherical head model.

At 706, the method 700 includes filtering the audio signals based on frequency range. The method 700 transmits low frequency signals that are less than 200 Hz to a low frequency channel at 708. At 710, the method 700 equalizes the low frequency channel.

At 712, the method 700 includes convolving the high frequency signals with HRIR and/or BRIR based on additional data. The HRIR may be obtained by interpolating an HRIR based on an array of time aligned HRIR at various locations, head position of the user, and input audio location, receiver location, speaker location, and the audio signal.

At 714, the method 700 includes dividing the HRIR convolved high frequency output into a left output and a right output for additional signal processing.

At 716, the method 700 includes processing the divided left output and right output signals in parallel. The method 700 includes at 716*a* delaying an arrival time of the signal based on a look-up table or a spherical head model. The method 700 includes at 716*b* applying pre-EQ. At 716*c*, the equalized low frequency range is added to the signal. At 716*d*, the method 700 includes applying post-EQ. At 716*e*, the method 700 includes applying near-field correction. In one example, the right output processing includes delaying right arrival time, applying right pre-EQ, adding in the LFE channel, and applying right post-EQ. In one example, left output processing includes delaying left arrival time, applying left pre-EQ, adding in the LFE channel, and applying left post-EQ. In one example, the filtered left and right output may be referred to as a filtered high frequency output.

At 718, the method 700 includes outputting the audio to a left driver and a right driver. In some examples, the method further includes applying crosstalk cancellation filters to the filtered high frequency output. For example, the filtered high frequency output may be an input to a crosstalk cancellation filtering method, such as described with reference to FIGS. 4-5.

FIG. 8 is a flow chart of a method 800 of tuning personalized audio in in accordance with embodiments of the disclosed technology. The method 800 may include one or more instructions or operations stored on memory (e.g., the memory 114 or the database 117 of FIG. 1) and executed by a processor in a computer (e.g., the processor 115 in the computer 110 of FIG. 1). The method 800 may be used to tune an immersive audio experience using on a user's HRTF/HRIR based on measurements performed and/or captured in an anechoic and/or non-anechoic environment and including signal processing for fixed speakers not mounted on the head. In a non-limiting example, the process 400 may be carried out according to the method 800.

At 802, the method 800 includes receiving audio signals corresponding to sound energy acquired at one or more transducers (e.g., one or more of the microphones 106 and/or sensors 116 on the listening device 102 of FIG. 1). The audio signals may include audio signals received from ambient noise sources (e.g., the sound sources 122*a*-*d* of FIG. 1) and/or a predetermined signal generated by the method 700 and played back via a loudspeaker (e.g., the loudspeaker 126 of FIG. 1). Predetermined signals may include, for example, standard test signals such as a Maximum Length Sequence (MLS), a sine sweep and/or another suitable sound that is "known" to the algorithm.

At 803, the method 800 includes receiving additional data from one or more sensors (e.g., the sensors 116 of FIG. 1), such as, the location of the head of the user and/or the location of one or more sound sources. In one embodiment, the location of sound sources may be defined as range, azimuth, and elevation (r, theta, phi) with respect to the ear entrance point (EEP) or a reference point to the center of the head, between the ears, may also be used for sources sufficiently far away such that the differences in (r, theta, phi) between the left and right EEP are negligible. In other embodiments, however, other coordinate systems and alternate reference points may be used. Further, in some embodiments, a location of a source may be predefined, as for standard 5.1 and 7.1 channel formats. In some other embodiments, however, the sound sources may be arbitrarily positioned, have dynamic positioning, or have a user-defined positioning. The additional data may include an array of time aligned HRIR at various locations in the audio environment. The additional data may include a frame of reference stored in a location engine. The additional data may include a plurality of arrival time delays stored in a look-up table. In another example, the additional data may include a spherical head model.

At 804, the method 800 includes filtering the audio signals based on frequency range. In one example, the filtering may implement a two-way crossover approach to differentiate between signals greater than a first threshold frequency and less than the first threshold frequency at 806. The first threshold frequency may be, in one example, 200 Hz. The method 800 transmits a low frequency band comprising signals that are less than 200 Hz to a low frequency channel at 808.

From 808 the method 800 may proceed to 810. At 810, the method 800 includes applying equalizing the low frequency channel. After 810, the method may proceed to 812. At 812, the method 800 includes applying delay to the low frequency channel.

The method 800 transmits a higher frequency band comprising signals greater than 200 Hz to an appropriate channel at 814. At 816, the method 800 includes applying near ear equalizing to the higher frequency channel. At 817, the method 800 includes convolving the signal into left HRIR and right HRIR.

At 818, the method 800 includes processing the left HRIR and right HRIR convolved signals separately in parallel. At 818*a*, the method 800 applies HRIR time shift to the signal. The signal is filtered through high pass and low pass filters at 818*b*. In some examples, the low pass filtered left HRIR signal undergoes further processing. For example, the method may include applying interaural time delay to the low pass filtered left HRIR signal. The low pass filtered and delayed left HRIR signal may be further filtered with crosstalk cancellation filters, the polarity inverted and the signal added to right output. In some examples, the separate processing and addition to the right driver output provides crosstalk cancelation between the left and right ears of the user. At 818*c*, the method 800 includes combining the filtered signals.

At 820, the method 800 includes applying band-limited crosstalk cancellation to the filtered signals. In one example, the crosstalk cancellation may be achieved by determining a set of filters with a focus on achieving a desired response at the entrance of the ears, such as following the approach described with reference to FIG. 5. For example, filters may be designed based on any one or more of pseudo-inverse, regularized inverse, frequency-dependent regularization, and LMS filtering with an arbitrary penalty function. In one example, the approach includes band limiting the crosstalk cancellation at high frequencies when the natural separation between the ears is high enough.

At 822, the method 800 includes outputting the audio to a left driver, a right driver, and an LFE speaker. In some examples, the combined filtered signals, e.g., the filtered high frequency band and the filtered low frequency band, may be output to one or more speakers of the audio system.

In this way, by generating personalized audio calibrations, applying spatial processing approaches, and crosstalk cancellation, an immersive experience may be provided for a personalized audio system including speakers where the user is free to move relative thereto, such as headrest speakers.

The disclosure also provides support for a sound calibration system, comprising: a headrest having a first speaker, a second speaker, and one or more sensors, the headrest configured to engage a head of a user, and a controller with computer readable instructions stored on non-transitory memory that when executed cause the controller to: generate personalized spatial audio using a head related impulse response (HRIR), the HRIR modified based on an input audio signal, an audio signal source location, a receiver location, and a head position of the user relative thereto, and produce audio output based on the HRIR and further based on interaural crosstalk cancellation filters filtering the input audio signal, wherein the HRIR and the interaural crosstalk cancellation filters are applied to frequencies greater than a first threshold frequency. In a first example of the system, the head of the user is free to move relative to the first speaker and the second speaker. In a second example of the system, optionally including the first example, the interaural crosstalk cancellation filters comprise one or more of pseudo-inverse, regularized inverse, frequency-dependent regularization, and LMS filters with an arbitrary penalty function. In a third example of the system, optionally including one or both of the first and second examples, HRIR is determined based one or more of anatomical features of the user, interaural time difference, interaural level difference, a spectral model comprising fine-scale frequency response features, relative location of transducers to pinnae, and range correction of near-field differences. In a fourth example of the system, optionally including one or more or each of the first through third examples, the HRIR is interpolated to a desired location based on an array of time aligned HRIR corresponding to locations around the user and a frame of reference stored in a location engine. In a fifth example of the system, optionally including one or more or each of the first through fourth examples, the frame of reference is updated based on the audio signal source location and the head position of the user relative thereto. In a sixth example of the system, optionally including one or more or each of the first through fifth examples the computer readable instructions further comprising: divide the input audio signal into a high frequency band and a low frequency band based on the first threshold frequency, apply delay and equalizing to the low frequency band, and convolve the high frequency band with the HRIR, and divide a HRIR convolved high frequency output into a left output and a right output, wherein the left output and the right output undergo additional signal processing separately prior to filtering by the interaural crosstalk cancellation filters. In a seventh example of the system, optionally including one or more or each of the first through sixth examples, the additional signal processing comprises one or more of arrival time delay, pre-equalizing, recombination with the low frequency band, post-equalizing, and near-field correction. In a eighth example of the system, optionally including one or more or each of the first through seventh examples, the arrival time delay is determined based on a look-up table comprising interaural level difference measurements for the user, wherein inputs to the look-up table comprise the audio signal source location and the head position of the user. In a ninth example of the system, optionally including one or more or each of the first through eighth examples, the arrival time delay is determined based on a continuous spherical head model, wherein inputs to the continuous spherical head model include the audio signal source location and the head position of the user.

The disclosure also provides support for a method of calibrating sound for a listener, the method comprising: receiving an input audio signal, an audio signal source location, a receiver location, and a head position of a user, determining an HRIR for the user based on an array of time aligned HRIR corresponding to locations around the user, the audio signal source location, the receiver location, and the head position, dividing the input audio signal into a high frequency band and a low frequency band, applying delay and equalizing to the low frequency band to produce a filtered low frequency output, convolving the high frequency band with the HRIR to produce an HRIR convolved high frequency output, filtering the HRIR convolved high frequency output with interaural crosstalk cancellation filters to produce a crosstalk filtered high frequency output, combining the filtered low frequency output and the crosstalk filtered high frequency output into combined filtered signals, and producing an audio output based on the combined filtered signals. In a first example of the method, the interaural crosstalk cancellation filters comprise one or more of pseudo-inverse, regularized inverse, frequency-dependent regularization, and LMS filters with an arbitrary penalty function. In a second example of the method, optionally including the first example, the method further comprises: dividing the HRIR convolved high frequency output into a left output and a right output, wherein the left output and the right output undergo additional signal processing separately prior to filtering by the interaural crosstalk cancellation filters. In a third example of the method, optionally including one or both of the first and second examples, the additional signal processing comprises one or more of arrival time delay, pre-equalizing, recombination with the low frequency band, post-equalizing, and near-field correction. In a fourth example of the method, optionally including one or more or each of the first through third examples, the arrival time delay is determined based on one of a look-up table comprising interaural level difference measurements for the user and a continuous spherical head model, wherein inputs to the look-up table and the continuous spherical head model comprise the audio signal source location and the head position.

The disclosure also provides support for a system comprising: a headrest having a left speaker and a right speaker, the headrest configured to engage a head of a user, a sensor tracking a head position of the user, an audio signal source, an array of time aligned head related impulse responses (HRIR) corresponding to locations around the user, and a controller in electronic communication with the sensor and the audio signal source with computer readable instructions stored on non-transitory memory that when executed cause the controller to: receive an input audio signal, an audio signal source location, a receiver location, and the head position, determine HRIR for the user based on the array of time aligned HRIR corresponding to locations around the user, the audio signal source location, the receiver location, and the head position, divide the input audio signal into a high frequency band and a low frequency band, apply delay and equalizing to the low frequency band to produce a filtered low frequency output, convolve the high frequency band with the HRIR to produce an HRIR convolved high frequency output, filter the HRIR convolved high frequency output with interaural crosstalk cancellation filters to produce a crosstalk filtered high frequency output, combine the filtered low frequency output and the crosstalk filtered high frequency output into combined filtered signals, and produce an audio output based on the combined filtered signals. In a first example of the system, the system further comprises: interpolating the HRIR to a desired location based on the array of time aligned HRIR corresponding to locations around the user and a frame of reference stored in a location engine, wherein the frame of reference is updated based on the audio signal source location and the head position of the user relative thereto. In a second example of the system, optionally including the first example, the HRIR is determined based one or more of anatomical features of the user, interaural time difference, interaural level difference, a spectral model comprising fine-scale frequency response features, relative location of transducers to pinnae, and range correction of near-field differences. In a third example of the system, optionally including one or both of the first and second examples, the interaural crosstalk cancellation filters comprise one or more of pseudo-inverse, regularized inverse, frequency-dependent regularization, and LMS filters with an arbitrary penalty function. In a fourth example of the system, optionally including one or more or each of the first through third examples, the system further comprises: dividing the HRIR convolved high frequency output into a left output and a right output, wherein the left output and the right output undergo additional signal processing separately prior to filtering by the interaural crosstalk cancellation filters, wherein the additional signal processing comprises one or more of arrival time delay, pre-equalizing, recombination with the low frequency band, post-equalizing, and near-field correction.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the computer 110, the audio system 100, the listening device 102 and/or user 101 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word “a” or “an” should be understood as not excluding plural of said elements or steps, unless such exclusion is stated. Furthermore, references to “one embodiment” or “one example” of the present disclosure are not intended to be interpreted as excluding the existence of additional embodiments that also incorporate the recited features. The terms “first,” “second,” and “third,” etc. are used merely as labels, and are not intended to impose numerical requirements or a particular positional order on their objects. The following claims particularly point out subject matter from the above disclosure that is regarded as novel and non-obvious.

The invention claimed is:

1. A sound calibration system, comprising:

a headrest having a first speaker, a second speaker, and one or more sensors, the headrest configured to engage a head of a user; and a controller with computer readable instructions stored on non-transitory memory that when executed cause the controller to:

generate personalized spatial audio using a head related impulse response (HRIR), the HRIR modified based on an input audio signal, an audio signal source location, a receiver location, and a head position of the user relative thereto; and produce audio output based on the HRIR and further based on interaural crosstalk cancellation filters filtering the input audio signal, wherein the HRIR and the interaural crosstalk cancellation filters are applied to frequencies greater than a first threshold frequency;

wherein the HRIR is an impulse response of a head related transfer function (HRTF); and wherein the HRIR is interpolated to a desired location based on an array of time aligned HRIR corresponding to multiple locations around the user and a frame of reference stored in a location engine;

the computer readable instructions further causing the controller to:

divide the input audio signal into a high frequency band and a low frequency band based on the first threshold frequency;

apply delay and equalizing to the low frequency band;

convolve the high frequency band with the HRIR to produce an HRIR convolved high frequency output;

divide the HRIR convolved high frequency output into a left output and a right output;

apply an arrival time delay to each of the left output and the right output separately;

apply a pre-equalizing to each of the left output and the right output separately;

recombine each of the left output and the right output with the low frequency band;

apply a post-equalizing to each of the left output and the right output separately; and apply a near-field correction to each of the left output and the right output separately based on a near-field model using a low shelf filter and a high shelf filter, prior to filtering by the interaural crosstalk cancellation filters.

2. The sound calibration system of claim 1, wherein the head of the user is free to move relative to the first speaker and the second speaker.

3. The sound calibration system of claim 1, wherein the interaural crosstalk cancellation filters comprise one or more of pseudo-inverse, regularized inverse, frequency-dependent regularization, and LMS filters with an arbitrary penalty function.

4. The sound calibration system of claim 1, wherein HRIR is determined based one or more of anatomical features of the user, interaural time difference, interaural level difference, a spectral model comprising fine-scale frequency response features, relative location of transducers to pinnae, and range correction of near-field differences.

5. The sound calibration system of claim 1, wherein the frame of reference is updated based on the audio signal source location and the head position of the user relative thereto.

6. The sound calibration system of claim 1, wherein the low shelf filter and the high shelf filter have settings depending on an azimuth, elevation, and distance of a virtual audio signal source to the user.

7. The sound calibration system of claim 1, wherein the arrival time delay is determined based on a look-up table comprising interaural time difference measurements for the user, wherein inputs to the look-up table comprise the audio signal source location and the head position of the user.

8. The sound calibration system of claim 1, wherein the arrival time delay is determined based on a continuous spherical head model, wherein inputs to the continuous spherical head model include the audio signal source location and the head position of the user.

9. A method of calibrating sound for a listener, the method comprising:

receiving an input audio signal, an audio signal source location, a receiver location, and a head position of a user;

determining an HRIR for the user based on an array of time aligned HRIR corresponding to locations around the user, the audio signal source location, the receiver location, and the head position;

dividing the input audio signal into a high frequency band and a low frequency band;

applying delay and equalizing to the low frequency band to produce a filtered low frequency output;

convolving the high frequency band with the HRIR to produce an HRIR convolved high frequency output;

dividing the HRIR convolved high frequency output into a left output and a right output;

applying an arrival time delay to each of the left output and the right output separately;

applying a pre-equalizing to each of the left output and the right output separately;

recombining each of the left output and the right output with the filtered low frequency output;

applying a post-equalizing to each of the left output and the right output separately;

applying a near-field correction to each of the left output and the right output separately based on a near-field model using a using a low shelf filter and a high shelf filter;

filtering the HRIR convolved high frequency output with interaural crosstalk cancellation filters to produce a crosstalk filtered high frequency output;

combining the filtered low frequency output and the crosstalk filtered high frequency output into combined filtered signals; and producing an audio output based on the combined filtered signals;

wherein the HRIR is an impulse response of a head related transfer function (HRTF).

10. The method of claim 9, wherein the interaural crosstalk cancellation filters comprise one or more of pseudo-inverse, regularized inverse, frequency-dependent regularization, and LMS filters with an arbitrary penalty function.

11. The method of claim 9, wherein the arrival time delay is determined based on one of a look-up table comprising interaural time difference measurements for the user and a continuous spherical head model, wherein inputs to the look-up table and the continuous spherical head model comprise the audio signal source location and the head position.

12. A system comprising:

a headrest having a left speaker and a right speaker, the headrest configured to engage a head of a user;

a sensor tracking a head position of the user;

an audio signal source;

an array of time aligned head related impulse responses (HRIR) corresponding to locations around the user; and a controller in electronic communication with the sensor and the audio signal source with computer readable instructions stored on non-transitory memory that when executed cause the controller to:

receive an input audio signal, an audio signal source location, a receiver location, and the head position;

determine HRIR for the user based on the array of time aligned HRIR corresponding to locations around the user, the audio signal source location, the receiver location, and the head position;

divide the input audio signal into a high frequency band and a low frequency band;

apply delay and equalizing to the low frequency band to produce a filtered low frequency output;

convolve the high frequency band with the HRIR to produce an HRIR convolved high frequency output;

divide the HRIR convolved high frequency output into a left output and a right output;

apply an arrival time delay to each of the left output and the right output separately;

recombine each of the left output and the right output with the filtered low frequency output;

apply a post-equalizing to each of the left output and the right output separately;

apply a near-field correction to each of the left output and the right output separately based on a near-field model using a low shelf filter and a high shelf filter;

filter the HRIR convolved high frequency output with interaural crosstalk cancellation filters to produce a crosstalk filtered high frequency output;

combine the filtered low frequency output and the crosstalk filtered high frequency output into combined filtered signals; and produce an audio output based on the combined filtered signals;

wherein the HRIR is an impulse response of a head related transfer function (HRTF).

13. The system of claim 12, further comprising interpolating the HRIR to a desired location based on the array of time aligned HRIR corresponding to locations around the user and a frame of reference stored in a location engine, wherein the frame of reference is updated based on the audio signal source location and the head position of the user relative thereto.

14. The system of claim 12, wherein the HRIR is determined based one or more of anatomical features of the user, interaural time difference, interaural level difference, a spectral model comprising fine-scale frequency response features, relative location of transducers to pinnae, and range correction of near-field differences.

15. The system of claim 12, wherein the interaural crosstalk cancellation filters comprise one or more of pseudo-inverse, regularized inverse, frequency-dependent regularization, and LMS filters with an arbitrary penalty function.

* * * * *